United States Patent
Alriksson et al.

(10) Patent No.: US 10,939,363 B2
(45) Date of Patent: Mar. 2, 2021

(54) DETECTION OF POTENTIAL SYSTEM REFERENCE CONFLICTS

(71) Applicant: Telefonaktiebolaget LM Ericsson (publ), Stockholm (SE)

(72) Inventors: Peter Alriksson, Hörby (SE); Erik Eriksson, Linköping (SE); Pål Frenger, Linköping (SE); Johan Rune, Lidingö (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/338,558

(22) PCT Filed: Oct. 4, 2016

(86) PCT No.: PCT/EP2016/073696
§ 371 (c)(1),
(2) Date: Apr. 1, 2019

(87) PCT Pub. No.: WO2018/065037
PCT Pub. Date: Apr. 12, 2018

(65) Prior Publication Data
US 2020/0045619 A1 Feb. 6, 2020

(51) Int. Cl.
*H04W 48/14* (2009.01)
*H04W 76/11* (2018.01)
(Continued)

(52) U.S. Cl.
CPC ........... *H04W 48/14* (2013.01); *H04W 48/02* (2013.01); *H04W 76/11* (2018.02); *H04W 84/042* (2013.01)

(58) Field of Classification Search
CPC ..... H04W 48/14; H04W 48/02; H04W 76/11; H04W 84/042
(Continued)

(56) References Cited

U.S. PATENT DOCUMENTS

| | | | | |
|---|---|---|---|---|
| 2004/0225897 | A1* | 11/2004 | Norton | H04L 63/02 726/14 |
| 2011/0294508 | A1* | 12/2011 | Min | H04W 36/0085 455/436 |
| 2015/0378865 | A1* | 12/2015 | Robertson | G06F 11/0766 714/57 |

OTHER PUBLICATIONS

Rawat, Priyanka, et al., "Towards efficient disaster management: 5G and Device to Device communication", 2015 2nd International Conference on Information and Communication Technologies for Disaster Management (ICT-DM), Nov. 30-Dec. 2, 2015, 1-9.
(Continued)

*Primary Examiner* — Chi Tang P Cheng
(74) *Attorney, Agent, or Firm* — Murphy, Bilak & Homiller, PLLC

(57) ABSTRACT

The disclosure relates to methods, devices, and computer programs in mobile communications for detecting potential system information reference conflicts. In particular, the present disclosure relates to a method (20), performed in a wireless device, for detecting potential system information reference conflicts. The method comprises receiving (S21) first access information from a network node of a first wireless network, the first access information comprising a first system information reference and a first identifier relating to the first wireless network. The method also comprises determining (S23) a potential system information reference conflict based on a comparison of the first access information and second access information. The second access information is received from the first or a second wireless network; and comprises a second system information reference and a second identifier relating to the wireless network from which the second access information is received. The disclosure also relates to corresponding methods performed in network nodes.

10 Claims, 4 Drawing Sheets

(51) Int. Cl.
*H04W 48/02* (2009.01)
*H04W 84/04* (2009.01)

(58) Field of Classification Search
USPC .......................................... 370/329
See application file for complete search history.

(56) References Cited

OTHER PUBLICATIONS

Unknown, Author, "5G—Key Component of the Networked Society", RWS-150009, 3GPP RAN Workshop on 5G, Phoenix, Arizona, USA, Sep. 17-18, 2015, 1-55.

Unknown, Author, "The impact of a new flexible mobile RAT operating in frequency bands 6-100 GHz on 5G use cases: the vision of the mmMAGIC project", 3GPP TSG-SA WG1 Meeting #75, S1-162253, San Francisco, CA, Aug. 22-26, 2016, 1-21.

* cited by examiner

S21
Receiving first access information from a network node of a first wireless network, the first access information comprising a first system information reference and a first identifier relating to the first wireless network

S22
Receiving, from the first network node, a request to scan for and/or report a potential system information reference conflict

S23
determining a potential system information reference conflict based on a comparison of the first access information and second access information, wherein the second access information comprises a second system information reference and a second identifier

S231
Comparing a first pair comprising the first system information reference and the first network identifier with a second pair comprising the second system information reference and the second network identifier

S232
Comparing a first pair comprising the first system information reference and the first random access configuration with a second pair comprising the second system information reference and the second access configuration

S24
Transmitting a conflict report informing about a potential system information reference conflict

S241
Transmitting the Conflict report to the first network node and/or at least one other network node

Fig. 2

```
                    30 ─┐
    ┌─────────────────────────────────────────────────────────┐
    │                          S31                            │
    │ Determining the need for potential system information    │
    │                 reference conflict detection             │
    └─────────────────────────────────────────────────────────┘
                                │
    ┌─────────────────────────────────────────────────────────┐
    │                          S32                            │
    │  Transmitting first access information, the first access│
    │  information comprising a first system information      │
    │  reference and a first identifier relating to a first   │
    │                    wireless network                     │
    └─────────────────────────────────────────────────────────┘
                                │
    ┌─────────────────────────────────────────────────────────┐
    │                          S33                            │
    │  Transmitting a request for a conflict report from a    │
    │                    wireless device                      │
    └─────────────────────────────────────────────────────────┘
                                │
    ┌─────────────────────────────────────────────────────────┐
    │                          S34                            │
    │ Receiving a conflict report, the conflict report        │
    │ comprising at least one of                              │
    │ a. second access information received from a second     │
    │    wireless network, wherein the second access          │
    │    information comprises a second identifier relating   │
    │    to the wireless network from which the second access │
    │    information is received                              │
    │ b. an indication of a potential system information      │
    │    reference conflict                                   │
    └─────────────────────────────────────────────────────────┘
                                │
    ┌─────────────────────────────────────────────────────────┐
    │                          S35                            │
    │ Determining a potential system information reference    │
    │          conflict based on the conflict report          │
    └─────────────────────────────────────────────────────────┘
                                │
    ┌─────────────────────────────────────────────────────────┐
    │                          S36                            │
    │         Remapping the first system information reference│
    └─────────────────────────────────────────────────────────┘
                                │
    ┌─────────────────────────────────────────────────────────┐
    │                          S37                            │
    │ Informing other nodes in the same network about a       │
    │                   potential conflict                    │
    └─────────────────────────────────────────────────────────┘
```

Fig. 3

DETECTION OF POTENTIAL SYSTEM REFERENCE CONFLICTS

TECHNICAL FIELD

The disclosure relates to methods, devices, and computer programs in mobile communications for detecting potential system information reference conflicts.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink and is thought of as a next generation mobile communication system relative to UMTS.

In the future communication networks, also referred to as the 5th generation mobile networks, there will be evolvement of the current LTE system to the so called 5G system. The main task for 5G is to improve throughput and capacity compared to LTE. This is in part to be achieved by increasing the sample rate and bandwidth per carrier. 5G is also focusing on use of higher carrier frequencies, i.e. above 5-10 GHz.

5G New Radio, 5G-NR, is considered as the wireless standard that will become the foundation for the next generation of mobile networks. An index-based system information distribution concept is considered for 5G-NR. The 5G-NR proposal consists of a two-step mechanism for transmitting access information, wherein the access information comprises a list of access information configurations, herein called an Access Information Table, AIT, and an index pointing to a certain configuration in the AIT, defining the access information, herein called a System Signature Index, SSI. The SSI can also optionally be accompanied with a data container denoted herein as an SS Block, SSB, which allows more information to be conveyed than what is possible to encode in the SSI. In analogy to Long Term Evolution, LTE, the AIT may alternatively be called System Information Blocks, SIBs, or System Information Block Tables. Likewise, an SSB, may alternatively be referred to as a Master Information Block, MIB.

The SSI transmission period is typically shorter than that of the AIT. The value is a tradeoff between system energy performance, UE energy performance and access latency in cases where SSI needs to be read before access. Furthermore, sparse transmissions are good for coexistence with other networks when operating in unlicensed (shared) spectrum.

Due to the shared nature of the unlicensed spectrum there are no guarantees that different networks will not deploy nodes with the same SSI within a geographical area. This makes the risk of SSI collisions between networks larger than e.g., PCI collision problems in LTE.

One complication that can occur when nodes belonging to different networks use the same SSI, is that a wireless device might try to access a network node from one network with the access parameters, e.g., random access parameters, intended for a network node in the other network. This can result in repeated fruitless attempts by the wireless device to access the network, causing unnecessary delays for the user and interference to other wireless devices and network nodes.

Hence, there is a need for providing solutions to the problems stated above.

SUMMARY

An object of the present disclosure is to provide methods and devices configured to execute methods and computer programs which seek to mitigate, alleviate, or eliminate one or more of the above-identified deficiencies in the art and disadvantages singly or in any combination.

This object is achieved by a method, performed in a wireless device, for detecting potential system information reference conflicts. The method comprises receiving first access information from a network node of a first wireless network. The first access information comprises a first system information reference and a first identifier relating to the first wireless network. The method further comprises determining a potential system information reference conflict based on a comparison of the first access information and second access information. The second access information is received from the first or a second wireless network and the second access information comprises a second system information reference and a second identifier relating to the wireless network from which the second access information is received. Efficient methods for detecting system information reference collisions are key features for efficient operation in shared spectrum. Having wireless devices aiding the wireless network in detecting system information reference collisions can speed up detection or even allow the network to be proactive and change system information references before a potential conflict occurs. This further enables network nodes to change system information references without requiring wireless devices to re-read all system information. It also enables nodes to proactively change system information references to avoid collisions.

According to some aspects, the first and second identifiers comprises respective first and second network identifiers, the network identifiers being configured to enable identification of the network from which the first and second access information originates. The comparison of the first and second access information comprises comparing a first pair comprising the first system information reference and the first network identifier with a second pair comprising the second system information reference and the second network identifier. This detects potential inter-network system information reference conflicts.

According to some aspects, the first and second identifiers comprise respective first and second access configurations. The comparison of the first and second access information comprises comparing a first pair comprising the first system information reference and the first access configuration with a second pair comprising the second system information reference and the second access configuration. This detects potential intra-network system information reference conflicts.

According to some aspects, the method further comprises transmitting a conflict report informing about a potential system information reference conflict based on the first and second system information references being the same but referring to different first and second identifiers. The report enables a network node to determine the presence of a potential system information reference without having to perform any additional work. The report may further be used as a basis for resolving the potential conflict.

According to some aspects, the method further comprises receiving, from the first network node, a request to scan for and/or report a potential system information reference conflict. A network node may, by itself, suspect a potential system information reference conflict, e.g., based on repeated attempts by the wireless device to connect to it. By providing the requested information, the wireless device may assist a node in determining a potential system information reference conflict and how to resolve it.

According to some aspects, transmitting a conflict report further comprises transmitting the conflict report to the first network node and/or at least one other network node. By transmitting to nodes other than the first network node, other networks may also be notified of potential system information reference conflicts.

The present disclosure also relates to a wireless device. The wireless device comprises a radio communication interface configured to communicate with a network node and processing circuitry. The processing circuitry is configured to cause the wireless device to receive first access information from a network node of a first wireless network. The first access information comprises a first system information reference and a first identifier relating to the first wireless network. The processing circuitry is further configured to cause the wireless device to determine a potential system information reference conflict based on a comparison of the first access information and second access information. The second access information is received from the first or a second wireless network and comprises a second system information reference and a second identifier relating to the wireless network from which the second access information is received.

The present disclosure also relates to a computer program comprising computer program code which, when executed in a wireless device, causes the wireless device to perform the method disclosed above.

The wireless device and the computer program have all the technical effects and advantages of the method, performed in a wireless device, for detecting potential system information reference conflicts.

The present disclosure further relates to a method, performed in a first network node of a first wireless network, for detecting potential system information reference conflicts. The method comprises transmitting first access information. The first access information comprises a first system information reference and a first identifier relating to the first wireless network. The method further comprises receiving a conflict report from a wireless device. The conflict report comprises at least one of second access information received from a second wireless network, wherein the second access information comprises a second identifier relating to the wireless network from which the second access information is received; and an indication of a potential system information reference conflict. The method also comprises determining a potential system information reference conflict based on the conflict report. Efficient methods for detecting system information reference collisions are key features for efficient operation in shared spectrum. Enabling wireless devices to aid the wireless network in detecting system information reference collisions can speed up detection or even allow the network to be proactive and change system information references before a potential conflict occurs. The network node can change system information references without requiring wireless devices to re-read all system information. The network node can proactively change system information references to avoid collisions.

According to some aspects, the method further comprises remapping the first system information reference based on the first system information reference and a second system information reference being the same but referring to different first and second identifiers. This resolves the detected potential system information reference conflict.

According to some aspects, the method further comprises determining the need for potential system information reference conflict detection. Determining the need for potential system information reference conflict detection potentially reduces the amount of signalling and information processing required. For instance, the need for determining potential system information reference conflict detection may be triggered by detecting failed access attempts by a wireless device and can therefore be used to determine the cause for the failed access attempts and, if due to a system information reference conflict, resolve the conflict.

According to some aspects, the method further comprises transmitting a request for a conflict report from a wireless device. The conflict report assists the network node in determining the presence of a potential conflict, either by providing report on a conflict or by providing enough information for the network node to determine if there is a potential system information reference conflict present.

According to some aspects, the method further comprises the first network node informing other nodes in the same network about a potential conflict. By informing other nodes in the same network, the other nodes may also take action to resolve corresponding conflicts.

The present disclosure also relates to a network node. The network node comprises a network communication interface configured for communication with network nodes. The network node further comprises a radio communication interface configured for communication with a wireless device. The network node also comprises processing circuitry. The processing circuitry is configured to cause the network node to transmit first access information. The first access information comprises a first system information reference and a first identifier relating to a first wireless network. The processing circuitry is further configured to cause the network node to receive a conflict report from a wireless device, the conflict report comprising at least one of second access information received from a second wireless network, wherein the second access information comprises a second identifier relating to the wireless network from which the second access information is received; and an indication of a potential system information reference conflict. The processing circuitry is also configured to cause the network node to determine a potential system information reference conflict based on the conflict report.

The present disclosure also relates to a computer program comprising computer program code which, when executed in a network node of a first wireless network, causes the network node to perform the method disclosed above.

The network node and the computer program have all the effects and advantages of the method, performed in a first network node of a first wireless network, for detecting potential system information reference conflicts.

BRIEF DESCRIPTION OF THE DRAWINGS

FIG. 2 is a flowchart illustrating method steps, performed in a wireless device, for detecting potential system information reference conflicts;

FIG. 3 is a flowchart illustrating method steps, performed in a network node, for detecting potential system information reference conflicts;

DETAILED DESCRIPTION

Figure 1:
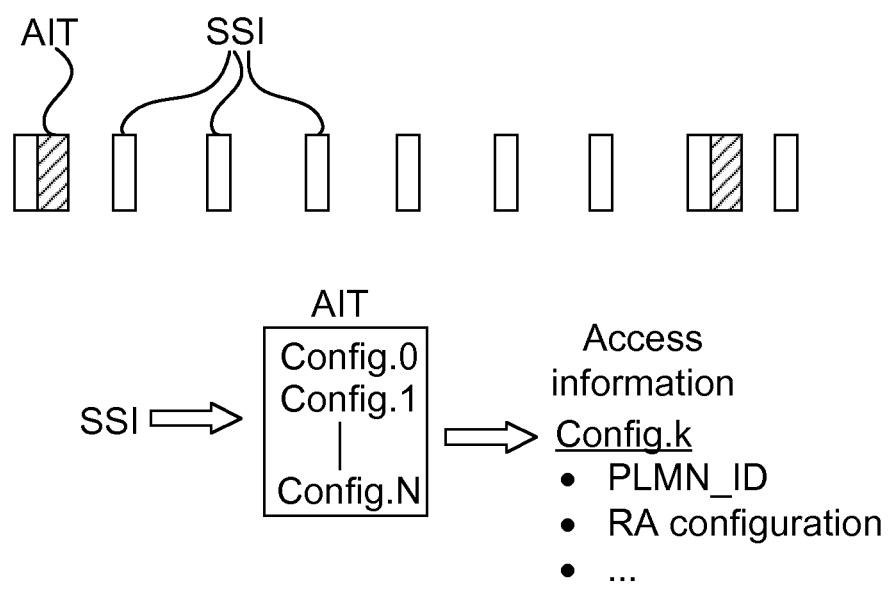
FIG. 1 illustrates a relationship between system information references and access information as envisioned in 5G-NR.

FIG. 1 illustrates a relationship between system information references and access information as envisioned in 5G NR. A system information reference here represented by a System Signature Index, SSI, points to certain access information, Config.0 . . . Config.N, in an access information table, AIT. The AIT comprises access information arranged to provide a wireless device with the necessary configuration to access a particular node, e.g., by random access. The access information comprises a network identifier, such as a Public Land Mobile Network Identifier, PLMN-ID, and a set of access configuration parameters, such as parameters for a random access, RA, configuration associated with a particular access configuration. The network identifier and the access configurations may serve as identifiers of either a network or an access configuration within a specific network, respectively.

The basic idea of the present disclosure is to detect potential SSI conflicts by comparing SSI-identifier pairs. If the same SSI is used for two different identifiers, then there might be a potential SSI conflict. For instance, if the same SSI points to two different PLMN-IDs, two networks may conflict with each other in an overlapping region. Another example would be if the same SSI points to two different access configurations within the same network, which could be a potential intra-network SSI conflict. Potential conflicts may be resolved by remapping SS's and/or updating AIT information. Further details of methods for detecting potential system information reference conflicts and optionally also resolving detected system information reference conflicts will be illustrated in more detail below.

FIG. 2 is a flowchart illustrating method steps, performed in a wireless device, for detecting potential system information reference conflicts.

The content of the AIT is assumed to be known by a wireless device performing a random access attempt. Typically, the wireless device has a stored copy of the previously acquired AIT, so that it only needs to receive the SSI to know which configuration it should use when accessing the network (and while remaining in the coverage of the same transmission point, the wireless device does not even have to receive the SSI before every access attempt).

The AIT in the wireless device can be updated in two ways:
1. A Common AIT, C-AIT, is broadcast by the network, typically with a longer periodicity than the SSI, e.g., every 500 ms. In some embodiments, the C-AIT periodicity may be the same as the SSI periodicity, e.g., in small indoor networks, and the maximum C-AIT periodicity may be very large, e.g., 10 seconds, in order to support extremely power limited scenarios, e.g., off-grid solar powered base stations.
2. A Dedicated AIT, D-AIT, transmitted to the wireless device using dedicated signaling in a dedicated beam after initial system access. The D-AIT specific to the wireless device may use the same SS's to point to different access configurations for different wireless devices. For instance, in the case of system congestion, this would allow for different access persistency values for different wireless devices.

The default delivery option for C-AIT is self-contained transmission in which all network nodes transmit both C-AIT and SSI, with C-AIT entries referring only to themselves. In addition to self-contained transmission, in order to support the design target on deployment flexibility, further delivery options for the C-AIT can be considered. Some examples include, the C-AIT being delivered by a node in an overlay network, delivered jointly by a plurality of nodes in a single frequency network or being delivered by a node in a Long Term Evolution, LTE, network.

For a wireless device to determine if it is allowed to operate in a network, the network typically transmits some type of identity that the wireless device is aware of. Examples of such identities are for example Public Land Mobile Network ID, PLMN-ID, Neutral Host-ID, NH-ID, or Participating Service Provider ID, PSP-ID. A network might also transmit multiple identities to facilitate network sharing.

In new radio, NR, the PLMN-ID, or lists thereof, is envisioned to be transmitted in or together with the C-AIT and optionally in the SSB. The PLMN-IDs in the SSB might not be the complete PLMN-ID, but rather a compressed version that enables the wireless device to reliably disqualify a network.

To sum up, at some point the wireless device receives access information from a network node. The access information comprises a system information reference, such as an SSI. The access information also comprises an identifier relating to the wireless network. The identifier may comprise a network ID, such as a PLMN-ID, and/or an access configuration. The identifier is typically comprised in an access information table, but may be provided in an SSB.

In other words, the method 20, performed in a wireless device, comprises receiving S21 first access information from a network node of a first wireless network, the first access information comprising a first system information reference and a first identifier relating to the first wireless network.

By monitoring e.g., failed access attempts by a wireless device, a network node can detect the presence of a potential SSI conflict. It can then request the wireless device to scan for and report SSI conflicts or the C-AIT(s) of other network (s). Thus, according to some aspects, the method 20 further comprises receiving S22, from the first network node, a request to scan for and/or report a potential system information reference conflict. Alternatively, wireless devices may collect such information as a default behavior and report it to a network node that requests it.

In a generalized view, any other broadcast parameters can also be used as an identifier. This way, SSI conflicts, or non-updated neighbor C-AITs in the own network can also be detected and reported by the wireless device.

Detection and Wireless Device Reporting of Inter-PLMN System-Related Identity (SSI) Conflicts In one embodiment, a wireless device compares first access information from a first wireless network in the form of newly detected SSI-PLMN-ID pairs with second access information in the form of previously detected SSI-PLMN-ID pairs.

The wireless device can e.g., detect the PLMN-ID from the SSB or, if the PLMN-ID is not present in the SSB, in the C-AIT. In other words, the method comprises determining S23 a potential system information reference conflict based on a comparison of the first access information and second access information. The PLMN-IDs are associated with a unique wireless network. In other words, the first and second identifiers comprises respective first and second network identifiers, the network identifiers being configured to enable identification of the network from which the first and second access information originates.

Here, the comparison aims at determining if the same system information reference, in the form of SSIs, is used for different identifiers, in the form of PLMN-IDs, i.e. while the first access information is received from the first wireless network; the second access information is received from a second wireless network.

In other words, the first access information comprises a first system information reference and a first identifier relating to the first wireless network. The second access information comprises a second system information reference and a second identifier relating to the wireless network from which the second access information is received. The comparison of the first and second access information comprises comparing S231 a first pair comprising the first system information reference and the first network identifier with a second pair comprising the second system information reference and the second network identifier. A potential system information reference conflict is considered detected if two SSI-PLMN-ID pairs have the same SSI but different PLMN-IDs.

In a preferred embodiment, if a potential conflict is detected, it is reported to a network node. In other words, the method comprises transmitting S24 a conflict report informing about a potential system information reference conflict based on the first and second system information references being the same but referring to different first and second identifiers.

The wireless device can be configured to either only report the conflicting SSI to a network node if that node's SSI is in conflict or it can report all conflicting SSIs, even the ones not used by this particular node, but by other nodes in the network.

The wireless device can further be configured to report conflicts only to nodes belonging to its own PLMN, i.e. network, or also to other PLMNs that are conflicting. In other words, a wireless device may optionally also report a detected SSI conflict to another PLMN than its home PLMN. For instance, a wireless device in Idle or Dormant mode may perform a Random Access to a non-home PLMN with the only purpose to inform the other network about a (potential or existing) SSI conflict that has been detected. In one embodiment, the wireless device may try to inform its home PLMN first, but if that is not possible it attaches to the other PLMN and sends a "(potential) inter-PLMN SSI conflict report". Stated differently, transmitting S24 a conflict report may further comprise transmitting the conflict report S241 to the first network node and/or at least one other network node.

Further, the wireless device can be configured to report as soon as a conflict is detected, after a certain time has elapsed or when the wireless device initiates communication with the network for some other reason. By reporting as soon as a conflict is detected, reporting speed is prioritized. By waiting a certain time, it is possible to establish if the potential conflict is transient in nature. Furthermore, it is possible to transmit the report as part of a bulk transfer, thereby reducing the amount of signaling. The reporting can also be triggered by the network node, and if the wireless device has not detected any conflicts, it indicates that.

The report can also contain reception quality information, e.g., reference signal strength and/or Signal-to-Noise-Ratio, SNR, and/or Signal-to-Interference-plus-Noise-Ratio, SINR. The wireless device can also be configured to only report conflicts for an SSI if certain reception quality conditions are fulfilled, e.g., signal strength or SNR/SINR being above a threshold. The reporting can be configured to be limited to a particular geographical area or to be limited in time.

According to some further aspects, a further refinement of the SSI conflict concept in the form of different "levels" of SSI conflict is introduced:

Level 1 (overlapping conflicting SSI transmissions): A wireless device can receive the same SSI from different PLMNs in the same location, i.e. without moving. The consequences of this may be incorrect interpretation of the SSI (i.e. mapping of the SSI to an entry in the C-AIT (or D-AIT) of another PLMN) and/or confusion with regards to the current transmission point.

Level 2 (non-overlapping conflicting SSI transmissions): The same SSI may be received from different PLMNs within a certain area, e.g., a local area within which SS's are unique (per PLMN), e.g., called "SSI area" (but not necessarily in the same location, i.e. the UE may receive the SSI from one PLMN in one location and from another PLMN in another location). An SSI area may e.g., be an area controlled by the same C-RAN or the same baseband unit. The consequences of this may be incorrect interpretation of the SSI (i.e. mapping of the SSI to an entry in the C-AIT (or D-AIT) of another PLMN) and/or confusion with regards to the current transmission point.

Level 3 (C-AIT level conflict): A certain SSI may only be actively used by one PLMN but is included in the C-AIT of another PLMN (e.g., in an SSI area). The consequences of this may be incorrect interpretation of the SSI (i.e. mapping of the SSI to an entry in the C-AIT (or D-AIT) of another PLMN).

Level 4 (potential SSI conflict via C-AIT): The same SSI is included in the C-AIT of more than one PLMN (e.g., in a SSI area), but is not actively used in any of the PLMNs. This represents a potential SSI conflict of levels 1-3. If one of the PLMNs starts to actively use the SSI, it turns into a level 3 conflict. If two or more of the PLMNs start to actively use the SSI, it turns into a level 1 or a level 2 conflict.

Based on the above, an illustrating example could be that a wireless device receives a request from a network node to scan for and report SS's belonging to other PLMNs in the vicinity. Since the wireless device has to be in the coverage area of the requesting network node, any occurrence of the same SSI (i.e. the same SSI as the requesting network node is using but broadcast from a network node belonging to another PLMN) that the wireless device detects represents a level 1 conflict. By optionally making the inclusion in the report conditional with respect to a threshold for the power with which the conflicting SSI was received, the requesting node can filter out (i.e. eliminate from the report) conflicting SS's that are used remotely enough to possibly be regarded as level 2 conflicts. Another option could be that the wireless device is requested to report only other PLMNs that are using the same SSI as the one currently being broadcast by the requesting network node.

According to some further aspects, detecting such SSI-PLMN-ID combinations is part of regular scanning operations at some stages of the behavior of the wireless device. In such case, the SSI detection and reporting feature does not have to include requesting the wireless device to do it.

To sum up, using a network identifier, e.g., the PLMN-ID or a compressed version of it, a wireless device can detect and report SSI conflicts to the network. The reporting can be both autonomous, and optionally time and/or area limited, and be requested by the network. The wireless device can report conflicts both to its own network and optionally to a conflicting network. The wireless device can report conflicts for only the SSI used by its serving node or for all SS's present in the network's C-AIT.

A wireless device can also report the C-AIT of another network operating in the same frequency band, so that the network node receiving the report can detect potential SSI conflicts by comparing the SSI entries with its own.

Detecting Intra-PLMN System Parameter Conflicts

In one embodiment all or a defined subset of all access configurations in the C-AIT is used as an identifier and a wireless device can be used to report SSI conflicts also within the same PLMN. To this end, a wireless device, either autonomously or by configuration, detects that the same SSI but with different access configurations is used in the same PLMN. In other words, the first and second identifiers comprise respective first and second access configurations. The comparison of the first and second access information comprises comparing S232 a first pair comprising the first system information reference and the first access configuration with a second pair comprising the second system information reference and the second access configuration. The comparison may be performed within a time and/or geographically limited area. If a potential SSI-access configuration is detected, the wireless device may report said potential conflict to the network. The wireless device may report only for its own serving SSI or for any SSI contained in the C-AIT. The reporting can also be triggered by the network node, and if the wireless device has not detected any conflicts it indicates that.

FIG. 3 is a flowchart illustrating method steps for detecting potential system information reference conflicts performed in a network node. The method 30, performed in a first network node of a first wireless network, for detecting potential system information reference conflicts, comprises transmitting S32 first access information. The transmitting of the first access information may be broadcast or transmitted via dedicated signalling. As stated above, the access information may comprise a broadcasted common access information table, C-AIT, or transmitted as a dedicated access information table, D-AIT. The first access information comprises a first system information reference and a first identifier relating to the first wireless network. The system information reference may be an SSI as defined above. The first identifier may be a PLMN-ID or an access configuration, as defined above.

When detecting a potential system information reference conflict, the network node is assisted by the wireless device. The wireless device either determines the presence of a potential system information reference conflict by itself or it transmits the necessary information to do so to the network node. The signalling is preferably based on the Radio Resource Control, RRC, protocol. Thus, the method comprises receiving S34 a conflict report from a wireless device. The conflict report comprises at least one of second access information received from a second wireless network, wherein the second access information comprises a second identifier relating to the wireless network from which the second access information is received; and an indication of a potential system information reference conflict. The second access information would then comprise the necessary information to allow the network node to determine the presence of a potential system information reference conflict, whereas the indication of a potential system information reference conflict may be used when the wireless device has already determined that a potential conflict may be present. By monitoring e.g., failed access attempts by a wireless device, a network node can detect the presence of a potential SSI conflict. In the case of triggered reporting, the network node can trigger more frequent scans and reports when it is newly deployed, because then it is more likely to cause new conflicts. The network node can also monitor the number of failed access attempts over some period of time and if a large number of failed attempts occur, trigger wireless devices to scan for and/or report SSI conflicts.

In other words, the method comprises determining S31 the need for potential system information reference conflict detection. It can then request the wireless device to scan for and report SSI conflicts and/or the C-AIT(s) of other network(s). In other words, the method further comprising transmitting S33 a request for a conflict report from a wireless device.

With the report, the network node may proceed to determine the presence of a potential system information conflict by processing the second access information or simply noticing the indication provided by the wireless device. In embodiments where the network node configures the wireless device to report the C-AIT of other networks, the network node then compares the SS's used by its own network to the SS's present in the other networks C-AITs. This information can be used to detect, and proactively avoid, both existing and potential SSI conflicts. This reporting can be configured to be limited to a geographical area.

In other words, the method further comprises determining S35 a potential system information reference conflict based on the conflict report.

When potential system information reference conflicts are determined by the network node itself, the same principles as described above for the wireless device applies. Pairs of SSI-identifiers are compared to see if the same SSI is used for different identifiers. Examples of identifiers are PLMD-IDs and access configurations.

With reference to the different "levels" of SSI conflict described above in relation to FIG. 2, an illustrating example could be that the network node requests a wireless device to scan for and report SS's belonging to other PLMNs in the vicinity. Since the wireless device has to be in the coverage area of the requesting network node, any occurrence of the same SSI (i.e. the same SSI as the requesting network node is using but broadcast from a network node belonging to another PLMN) that the wireless device detects represents a level 1 conflict. By optionally making the inclusion in the report conditional with respect to a threshold for the power with which the conflicting SSI was received the requesting network node can filter out (i.e. eliminate from the report) conflicting SS's that are used remotely enough to possibly be regarded as level 2 conflicts. Another option could be that the wireless device is requested to report only other PLMNs that are using the same SSI as the one currently being broadcast by the requesting network node.

According to another aspect, the network node requests a newly connected wireless device to report any SSI-PLMN-ID combination it has detected during a recent time period, e.g., the last 1 minute. This is a way to gather information about level 1, level 2 and level 3 conflicts. Regarding level 3 conflicts, the ones that are detected are the ones where an SSI included in the C-AIT of the requesting network node is actively used by another PLMN in the vicinity. If the wireless device is requested to also report the C-AITs of any other PLMNs detected during the same recent period, then also level 3 conflicts where the SSI being used by the requesting network node is included in the C-AIT of another PLMN can be detected. In addition, with C-AITs included in the report, level 4 conflicts may also be discovered.

There could thus be two modes: One where the network node requests the wireless device to scan and report and one where the network just requests the wireless device to report anything that it might already have detected recently. It would also be possible to request selected wireless devices to activate long term (until explicitly deactivated) SSI-PLMN-ID scanning and logging (or just activating logging of SSI-PLMN ID combinations that are anyway detected during scanning as part of regular behavior). This (scanning and logging) could also include receiving and logging C-AITs.

When a potential system information reference conflict is detected, there are several ways in which the potential conflict may be resolved, as will be illustrated below.

Resolving Inter-PLMN System-Related Identity (SSI) Conflicts

To totally remove a detected SSI conflict, the conflicting SSI should be removed from the C-AIT and any D-AITs. As a consequence, if the concerned SSI is the one currently being actively broadcast, the broadcast SSI will be changed. In other words, the method comprises remapping S36 the first system information reference based on the first system information reference and a second system information reference being the same but referring to different first and second identifiers. This will trigger receiving wireless devices to re-acquire the C-AIT (and possibly D-AIT), since the new SSI is unknown to them. As an optimization, there could also be a temporary indication in the SSB, informing the wireless device of the SSI replacement, i.e. "the current SSI points at the same access configuration as the old SSI-X". This indication would suffice for many wireless devices, so that they are not forced to re-acquire the C-AIT (and possibly D-AIT). If the changed conflicting SSI is not the one currently being broadcast, the regular C-AIT updating mechanisms may be used, e.g., C-AIT change indication via paging.

Again, in order to totally remove a detected SSI conflict, it is not enough to update the C-AIT and change the broadcast SSI (in case it is the conflicting one) in the network node detecting the conflict, but the same update should be done also in other network nodes in the vicinity, e.g., in the same SSI area. If the C-AIT is broadcast by an overlay network node covering the entire SSI area, then the C-AIT update comes for free. Otherwise, if the C-AIT is locally broadcast (even though shared in the SSI area), it has to be updated in every network node in the SSI area. The same goes for the network nodes which are actively broadcasting the conflicting SSI in the SSI area. In other words, the method may comprise the first network node informing S37 other nodes in the same network about a potential conflict. In a preferred embodiment, these updates are coordinated by a controlling entity that is informed of the detected conflict, e.g., a C-RAN or baseband unit controlling the SSI area or an operations and management, O&M, system.

For level 4 conflicts, an option is that the network initially does nothing. Only if a conflicting SSI is actually put to use, i.e. the conflict is escalated to a level 1, 2 or 3 conflict, then the network replaces the conflicting SSI in the C-AIT (and in the concerned SSI broadcast). The rationale for this would be to avoid impacting the wireless devices until really necessary. The network could choose to use a similar option also for level 3 and/or level 2 conflicts, e.g., leave level 3 conflicts unattended until escalated to level 1 or 2 and/or leave level 2 conflicts unattended until escalated to level 1.

In one embodiment, the C-AIT is constructed so that multiple SS's point to the same access information. This can e.g., be done by having lists of SSIs, ranges or wildcards. This allows a network node to change its SSI without updating the C-AIT as long as it chooses a new SSI which maps to the same access configuration. This would eliminate level 1 and 2 conflicts, but not level 3 and 4 conflicts. To eliminate level 3 and level 4 conflicts too, an SSI that has been replaced should also be removed from the C-AIT. In particular, newly deployed network nodes can be configured to have multiple SS's pointing to the same access configuration, because it is more likely that a newly deployed network node will have to changes its SSI due to conflicts with other already deployed network nodes. After the network node has been operational for a while it can start to remove duplicate SSI entries if no conflicts have been detected. This update of the C-AIT can preferably be done when the C-AIT anyway needs to be updated for other reasons. The multiple SS's pointing to the same access configuration may be efficiently encoded as a range of SSIs, e.g., using wild card encoding.

In another embodiment the C-AIT contains SS's that don't point to any access configurations yet, but are there as placeholders for future use, e.g., to be used as replacement SS's in case of detected SSI conflicts (which requires replacement of conflicting SSIs). Nodes from other networks can use this information to proactively avoid future conflicts.

By allowing multiple SS's to point out the same access configuration in the C-AIT, e.g., by wildcards or lists, the network node can change the SSI without affecting other wireless devices. A network node can also add placeholder SS's in its C-AIT to indicate to other networks (that have requested the inter-network C-AITs from its wireless devices) which SS's it intends to use. If the SSI is accompanied with an SS block, SSB, the SSB can indicate a remapping to avoid changing the C-AIT.

In the case of intra-network SSI-access configuration conflicts, it may be desirable to be able to identify which network nodes within the network that have potential conflicts. Thus, in some embodiments the C-AIT contains a unique identity that the network node can use to look up the conflicting C-AIT transmitter. Alternatively, this unique identity can be broadcast separately from the C-AIT, but it could still be received and reported by a wireless device. In other embodiments the access configuration in the C-AIT can be used as a hash-key to look up the transmitter using an operation and maintenance node.

Figure 4:
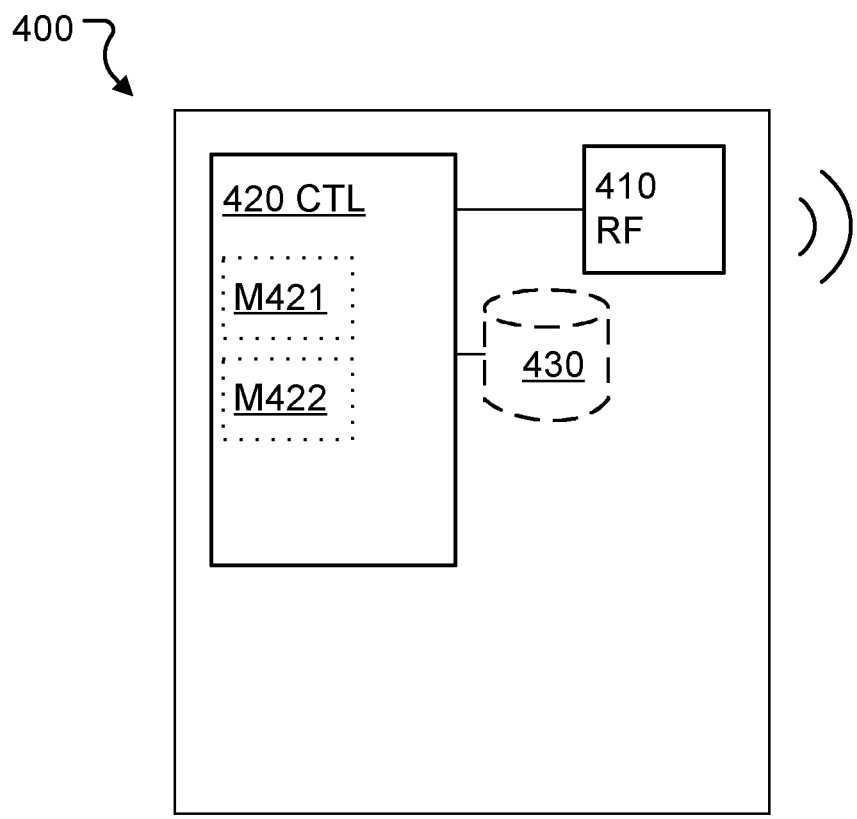
FIG. 4 illustrates a wireless device for detecting potential system information reference conflicts.

FIG. 4 illustrates a wireless device 400 for detecting potential system information reference conflicts. The wireless device 400 comprises a radio communication interface 410 configured to communicate with a network node. It should be appreciated that the radio communication interface 410 may be comprised as any number of transceiving, receiving, and/or transmitting units or circuitry. It should further be appreciated that the radio communication interface 410 may be in the form of any input/output communications port known in the art. The radio communication interface 410 may comprise RF circuitry and baseband processing circuitry (not shown). The wireless device 400 further comprises processing circuitry 420. The processing circuitry 420 is configured to cause the wireless device 400 to receive first access information from a network node of a first wireless network. The first access information comprises a first system information reference and a first identifier relating to the first wireless network. The processing circuitry 420 is further configured to cause the wireless device 400 to determine a potential system information reference conflict based on a comparison of the first access information and second access information. The second access information is received from the first or a second wireless network. The second access information comprises a second system information reference and a second identifier relating to the wireless network from which the second access information is received.

The processing circuitry 420 may be any suitable type of computation unit, e.g., a processor, a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry.

The wireless device 400 may further comprise at least one memory unit or circuitry 430 that may be in communication with the radio communication interface 410. The memory 430 may be configured to store received or transmitted data and/or executable program instructions. The memory 430 may be any suitable type of computer readable memory and may be of volatile and/or non-volatile type. According to some aspects, the disclosure relates to a computer program comprising computer program code which, when executed in a wireless device, causes the wireless device 400 to execute the methods described above. According to some aspects, the processing circuitry 420 comprises a receiving module M421 configured to receive first access information from a network node of a first wireless network, the first access information comprising a first system information reference and a first identifier relating to the first wireless network. The processing circuitry 420 further comprises a determining module M422 configured to determine a potential system information reference conflict based on a comparison of the first access information and second access information. The second access information is received from the first or a second wireless network and comprises a second system information reference and a second identifier relating to the wireless network from which the second access information is received. The modules are implemented in hardware or in software or in a combination thereof. The modules are according to one aspect implemented as a computer program stored in a memory 430 which run on the processing circuitry 420.

Figure 5:
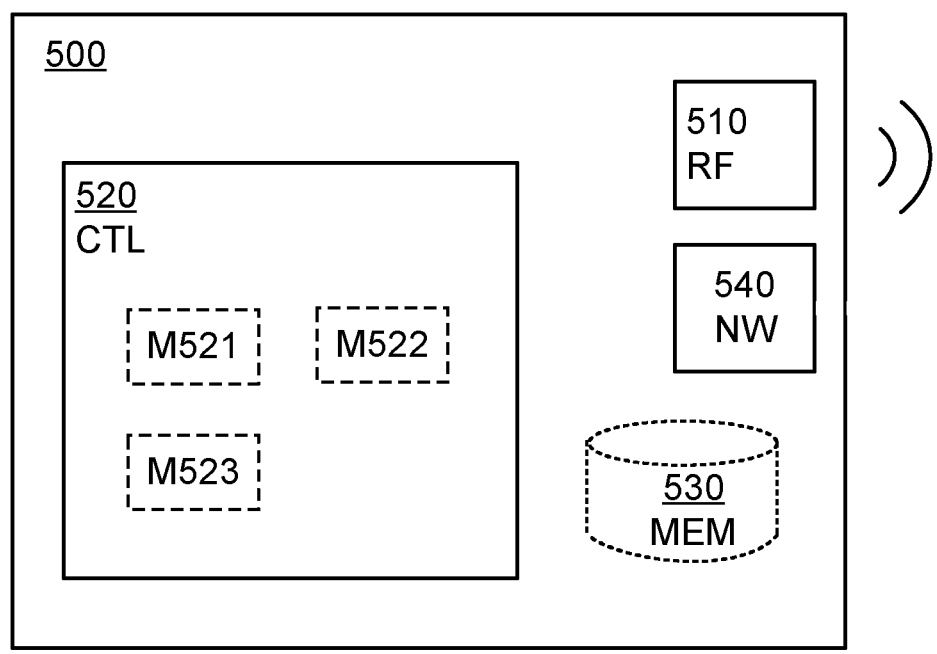
FIG. 5 illustrates a network node for detecting potential system information reference conflicts.

FIG. 5 illustrates a network node 500 of a first network for detecting potential system information reference conflicts. The network node 500 comprises a network communication interface 540 configured for communication with network nodes. This communication is often wired e.g., using fibre. However, it may as well be wireless. The network node further comprises a radio communication interface 510 configured for communication with a wireless device. The network node also comprises processing circuitry 520. The processing circuitry 520 is configured to cause the network node 500 to transmit first access information. The first access information comprises a first system information reference and a first identifier relating to the first wireless network. The processing circuitry 520 is further configured to cause the network node 500 to receive a conflict report from a wireless device. The conflict report comprises at least one of second access information received from a second wireless network, wherein the second access information comprises a second identifier relating to the wireless network from which the second access information is received; and an indication of a potential system information reference conflict. The processing circuitry 520 is also configured to cause the network node 500 to determine a potential system information reference conflict based on the conflict report.

The processing circuitry 520 may be any suitable type of computation unit, e.g., a processor, a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry.

The network node 500 may further comprise at least one memory unit or circuitry 530 that may be in communication with the radio communication interface 510. The memory 530 may be configured to store received or transmitted data and/or executable program instructions. The memory 530 may be any suitable type of computer readable memory and may be of volatile and/or non-volatile type. According to some aspects, the disclosure relates to a computer program comprising computer program code which, when executed in a wireless device, causes the wireless device 500 to execute the methods described above. According to some aspects the processing circuitry 520 comprises a transmitting module M521 configured to transmit first access information, the first access information comprising a first system information reference and a first identifier relating to the first wireless network. The processing circuitry 520 further comprises a receiving module M522 configured to receive a conflict report from a wireless device. The conflict report comprising at least one of second access information received from a second wireless network, wherein the second access information comprises a second identifier relating to the wireless network from which the second access information is received and an indication of a potential system information reference conflict. The processing circuitry 520 also comprises a determining module M523 configured to determine a potential system information reference conflict based on the conflict report. The modules are implemented in hardware or in software or in a combination thereof. The modules are according to one aspect implemented as a computer program stored in a memory 530 which run on the processing circuitry 520.

The invention claimed is:

1. A method, performed in a wireless device, the method comprising:
    detecting a potential System Signature Index (SSI) conflict, based on receiving an SSI paired with a first network identifier associated with a first wireless network and, for a same coverage location or area, receiving the SSI paired with a second network identifier associated with a second wireless network; and
    transmitting a conflict report for at least one of the first and second wireless networks, the conflict report indicating the potential SSI conflict.

2. The method according to claim 1, wherein detecting the potential SSI conflict comprises recognizing, based on comparing the first network identifier with the second network identifier, that the SSI is associated with two different network identifiers, with respect to the same coverage area or location.

3. The method according to claim 1, wherein receiving the SSI paired with the first network identifier comprises receiving a transmission from a first network node of the first wireless network, and wherein receiving the SSI paired with the second network identifier comprises receiving a transmission from a second network node of the second wireless network.

4. The method according to claim 1, further comprising receiving, from the first network node, a request to scan for SSI conflicts and wherein detecting the potential SSI conflict is based on scanning for SSI transmission in response to the request.

5. A wireless device comprising:
a radio communication interface configured to receiving signaling from and transmitting signaling to one or more wireless networks; and
processing circuitry configured to:
detect a potential System Signature Index (SSI) conflict, based on receiving an SSI paired with a first network identifier associated with a first wireless network and, for a same coverage location or area, receiving the SSI paired with a second network identifier associated with a second wireless network; and
transmit a conflict report for at least one of the first and second wireless networks, the conflict report indicating the potential SSI conflict.

6. A method, performed in a first network node of a first wireless network, the method comprising:
transmitting first access information, the first access information comprising a System Signature Index (SSI) and a first network identifier relating to the first wireless network; and
determining a potential SSI conflict for the SSI, based on receiving a conflict report from a wireless device that received the first access information and further received second access information for a same coverage location or area, the second access information including the SSI and a second network identifier relating to a second wireless network.

7. The method according to claim 6, wherein the SSI points to indexed access information in an access information table associated with the first network node, and wherein the method further comprises, in response to receiving the conflict report, associating a different SSI with the indexed access information.

8. The method according to claim 6, further comprising determining a need for scanning for potential SSI conflicts and transmitting a request to the wireless device to scan for potential SSI conflicts, and wherein the wireless device sends the conflict report responsive to scanning for potential SSI conflicts.

9. The method according to claim 6, further comprising the first network node informing other nodes in the same network about the potential SSI conflict.

10. A first network node configured for operation in a first wireless network, the first network node comprising:
a network communication interface configured for communication with network nodes;
a radio communication interface configured for communication with a-wireless devices; and
processing circuitry configured to cause the network node to:
transmit first access information, the first access information comprising a System Signature Index (SSI) and a first network identifier relating to the first wireless network;
determine a potential SSI conflict for the SSI, based on receiving a conflict report from a wireless device that received the first access information and further received second access information for a same coverage location or area, the second access information including the SSI and a second network identifier relating to a second wireless network.

* * * * *